US011209032B2

(12) United States Patent
Brewer et al.

(10) Patent No.: US 11,209,032 B2
(45) Date of Patent: Dec. 28, 2021

(54) ISOLATING FASTENER (71) Applicant: Ford Global Technologies, LLC, Dearborn, MI (US)

(72) Inventors: Katherine Jane Brewer, Belleville, MI (US); Sandra Osip, Livonia, MI (US); Ramon Michael Lee, Commerce Township, MI (US); Joshua D. Simon, Sylvania, OH (US); Christopher Newman, Farmington Hills, MI (US); Erzabeth Holcombe, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 293 days.

(21) Appl. No.: 16/380,633

(22) Filed: Apr. 10, 2019

(65) Prior Publication Data

US 2020/0325921 A1  Oct. 15, 2020

(51) Int. Cl.
*F16B 5/02* (2006.01)
*F16B 5/01* (2006.01)
*F16B 43/00* (2006.01)
*B62D 27/04* (2006.01)
*F16F 15/08* (2006.01)
*F01D 25/24* (2006.01)

(52) U.S. Cl.
CPC .......... *F16B 5/0241* (2013.01); *F01D 25/243* (2013.01); *F16B 5/01* (2013.01); *F16B 43/001* (2013.01); *B62D 27/04* (2013.01); *F16F 15/08* (2013.01)

(58) Field of Classification Search
CPC ........ F16B 5/0241; F16B 5/0258; F16B 5/01; F16B 5/0275; F16B 43/001; B62D 27/04; F02M 35/104; F02M 35/10295; F16F 15/08; F16F 1/3732; F16F 1/3735; F01D 25/243
USPC .................................................. 411/436, 437
See application file for complete search history.

(56) References Cited

U.S. PATENT DOCUMENTS

| | | | |
|---|---|---|---|
| 2,403,330 A | 7/1946 | Benton | |
| 3,218,101 A * | 11/1965 | Adams | F16F 3/0873 |
| | | | 296/35.1 |
| 3,809,427 A * | 5/1974 | Bennett | B60G 99/004 |
| | | | 296/35.1 |
| 3,841,682 A | 10/1974 | Church et al. | |
| 3,977,146 A | 8/1976 | Wiley | |
| 4,087,896 A | 5/1978 | Salter | |
| 4,975,008 A * | 12/1990 | Wagner | F02B 77/00 |
| | | | 411/337 |
| 5,150,509 A * | 9/1992 | Wils | F16B 5/0241 |
| | | | 29/525.04 |

(Continued)

*Primary Examiner* — Victor D Batson
*Assistant Examiner* — Amit Singh Dhillon
(74) *Attorney, Agent, or Firm* — Geoffrey Brumbaugh; McCoy Russell LLP (57) ABSTRACT

Methods and systems are provided for a fastening assembly. In one example, the fastening assembly includes a vibration dampening element, a two-piece insert, a lower portion, and a fastener configured to engage with the two-piece insert and the lower portion of the assembly. The fastening assembly may be at least partially assembled during manufacture of components to be coupled via the fastening assembly, allowing the components to be readily coupled during final installation of the fastening assembly.

19 Claims, 6 Drawing Sheets (56) References Cited

U.S. PATENT DOCUMENTS

| | | | |
|---|---|---|---|
| 5,225,647 A | | 7/1993 | Dufrenne |
| 5,342,106 A | * | 8/1994 | Fischer .................. B62D 27/04 |
| | | | 296/164 |
| 5,592,814 A | * | 1/1997 | Palusis ..................... F02K 1/80 |
| | | | 60/770 |
| 5,799,930 A | * | 9/1998 | Willett .................. B62D 24/02 |
| | | | 267/141.4 |
| 7,021,875 B2 | | 4/2006 | Yake et al. |
| 7,070,157 B2 | * | 7/2006 | Huprikar .................. F16F 1/37 |
| | | | 248/560 |
| 7,785,054 B2 | * | 8/2010 | Parisi .................... F16B 5/0241 |
| | | | 411/338 |
| 9,657,807 B2 | | 5/2017 | Morris et al. |
| 2005/0073166 A1 | | 4/2005 | Snyder |
| 2008/0136071 A1 | | 6/2008 | Weisbeck et al. |
| 2010/0086377 A1 | | 4/2010 | de Mola |
| 2011/0311333 A1 | * | 12/2011 | Schaser ................ F16B 43/001 |
| | | | 411/378 |
| 2017/0218889 A1 | * | 8/2017 | Nola ................ F02M 35/10085 |

* cited by examiner

ISOLATING FASTENER

FIELD

The present description relates generally to methods and systems for isolating engine components.

BACKGROUND/SUMMARY

Components of a vehicle engine may be subjected to vibrations and forces arising from engine motion during vehicle operation. Components experiencing a greater degree of agitation may come into contact with adjacent components and frequent and prolonged forceful contact between components may lead to degradation of engine parts. For example, oscillations generated at the engine's combustion chambers may be transmitted to an intake manifold and further communicated to less durable components, such as an intake airbox. The airbox may be prone to faster degradation as a result of high amplitude vibrations propagated through the intake manifold. Transmission of vibrational energy may be suppressed by positioning a vibration absorbing device between two or more components. For example, vibration isolating fasteners may be arranged between the components and in contact with each component. The fasteners may include inserts that interface with the components, allowing the fastener to be coupled to surfaces of the components. In addition, elements of the fasteners may be formed of a softer, more flexible material than the surrounding components and may interrupt propagation of vibrations between the components by at least partially absorbing and dampening the vibrational energy.

It may be particularly desirable to apply the fasteners to components formed of a composite material, the composite material allowing reduced weight and, in some examples, decreasing manufacturing costs. The composite material, however, may have lower resistance to compression and lower shear strength than more durable materials, such as metals, and may thus be less tolerant of high frequency oscillations. As a result, components formed from the composite material (hereafter, composite component) may be more prone to degradation from transmitted vibrations. By placing vibration isolating fasteners between the composite component and an adjacent, vibrating component, a lifetime of the composite component may be prolonged.

In some examples, the composite component may be mounted to another component and attached to the component using the vibration isolating fasteners. However, a tradeoff between a force used to insert the fasteners through the material of the composite component and a lower resistance of the material to opposing forces that pull the fasteners out of the material when vibrational energy is propagated through the fasteners may present difficulties with regards to adapting the fasteners to securely mount the composite component while imposing low strain on the material of composite component. If the opposing forces are not balanced, implementation of the fasteners in the composite material may cause material fatigue, such as tearing and/or inward collapsing, that reduces a life of the composite component.

Attempts to reduce strain on the composite material includes coupling a fastener to a bushing element to mount an object to the composite material. One example approach is shown by Wiley in U.S. Pat. No. 3,977,146. Therein, a bushing has an elongated shank adapted to be inserted through an opening in a panel formed of composite material. The shank has a radially enlarged head, positioned immediately below a head of a fastener (e.g., a bolt), receiving an edge of the opening in the panel to retain a positioning of the bushing in the panel. The fastener is threaded through the bushing and may protrude out of the panel at a tail end of the fastener. A nut may be threaded onto the tail end of the fastener to form a tight connection of the fastener within the shank. The enlarged head of the shank distributes compressive stresses across a widened surface area, thereby diffusing compressive strain at the opening of the panel.

However, the inventors herein have recognized potential issues with such systems. As one example, securing the fastener in place by threading the nut on the tail end may require application of a tool, such as a wrench or some other instrument to maintain the nut stationary while the fastener is rotated. In tight spaces, such as a front end compartment of a vehicle, where insertion of tools is restricted by close packaging of engine components, it may be difficult to reliably secure the fasteners to composite components using more than one tool. Thus, it is desirable to provide vibration isolation fasteners which may be easily installed, even in tight spaces and configured to effectively dampen propagating oscillations and reduce strain on composite components.

In one example, the issues described above may be addressed by a fastening assembly, including an upper portion divided between a first section and a second section, a lower portion arranged vertically below the upper portion and configured to couple to the second section of the upper portion, a dampening member circumferentially surrounding the second section of the upper portion, and a fastener configured to be inserted through both the upper portion and the lower portion and engage with the lower portion of the fastening assembly.

In this way, the vibration isolation fastening assembly may resist forces pulling the assembly outwards from the composite components and a fastener of the assembly may be inserted using a single tool applied to a fastener.

As one example, the vibration isolation fastening assembly includes a two-piece insert configured to interface with at least one composite component. A first, upper piece of the insert may be circumferentially surrounded by a vibration-absorbing element formed from a flexible material, the first piece shaped to guide insertion of the fastener into the insert and resist rotation of the upper piece as the fastener is rundown. A second, lower piece of the insert may be threaded to couple to both the upper piece and to receive the fastener. The two-piece insert of the vibration isolation fastening assembly may be pre-assembled in the composite component, allowing the fastener to be readily added and secured to the assembly during mounting and/or attaching of components.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-5 are shown approximately to scale

DETAILED DESCRIPTION

Figure 1:
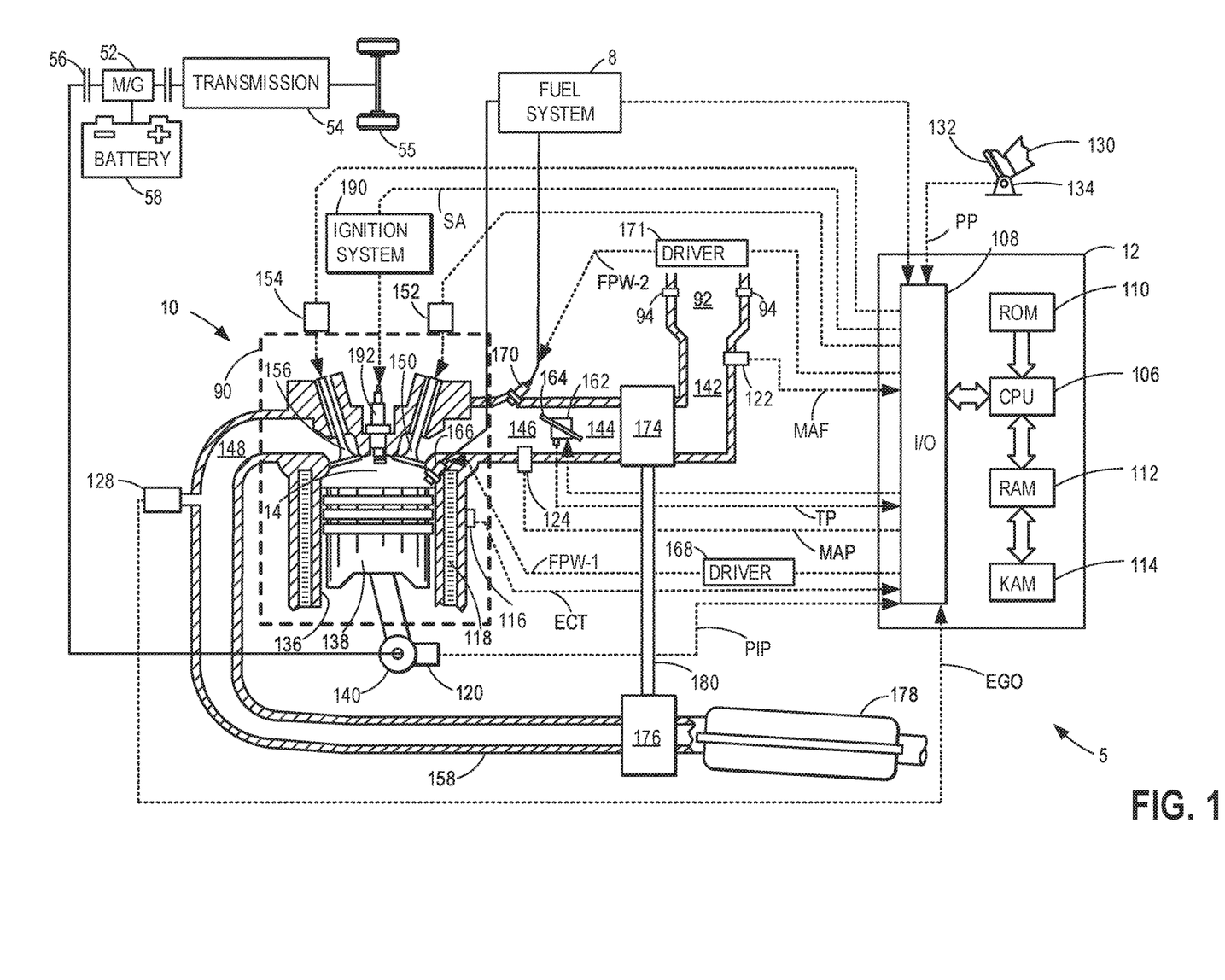
FIG. 1 shows an example of an engine system in which a vibration isolation fastening assembly may be used to attach or mount engine components.
Figure 2:
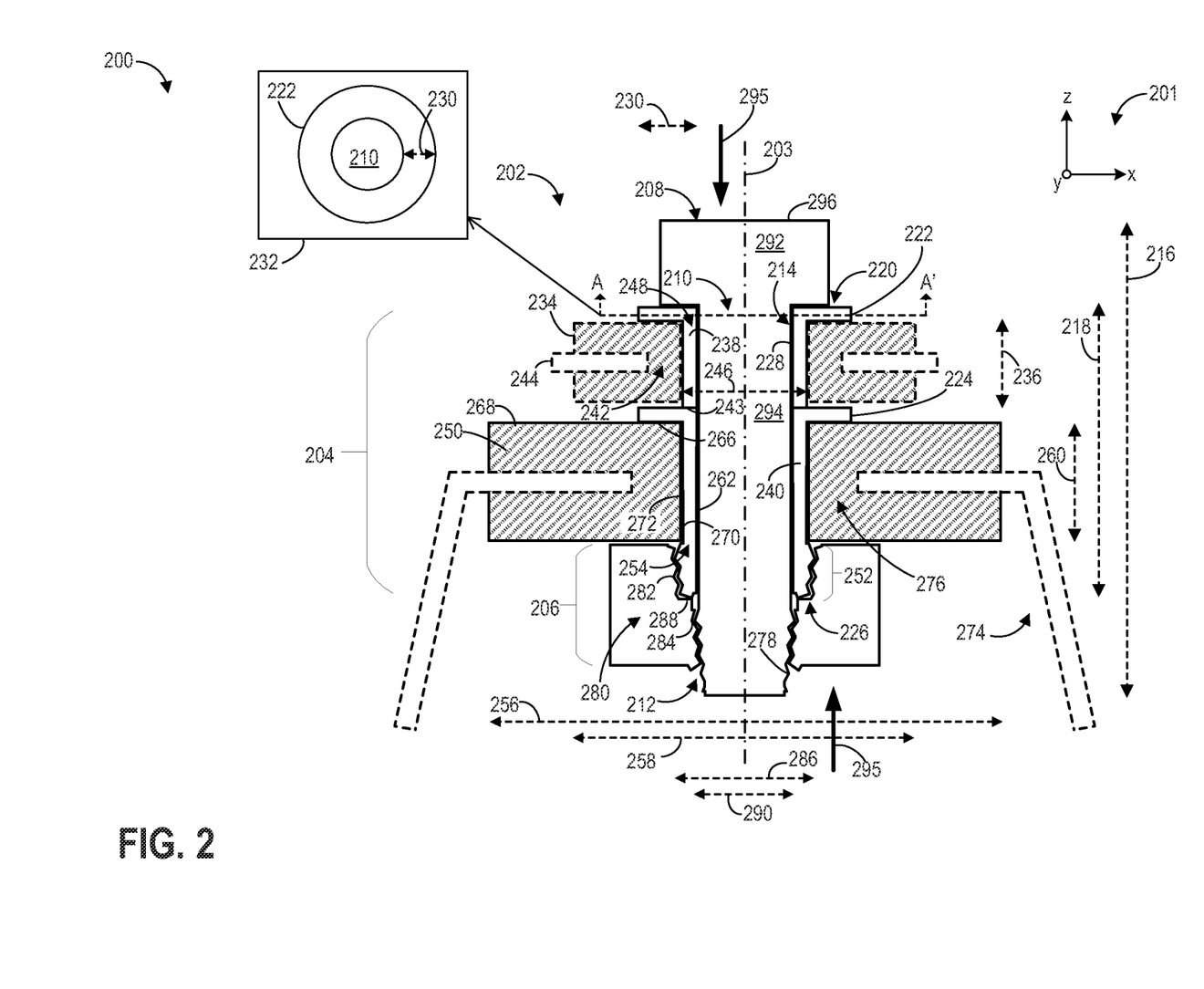
FIG. 2 shows a schematic diagram of a first example of a vibration isolation fastening assembly.
Figure 3:
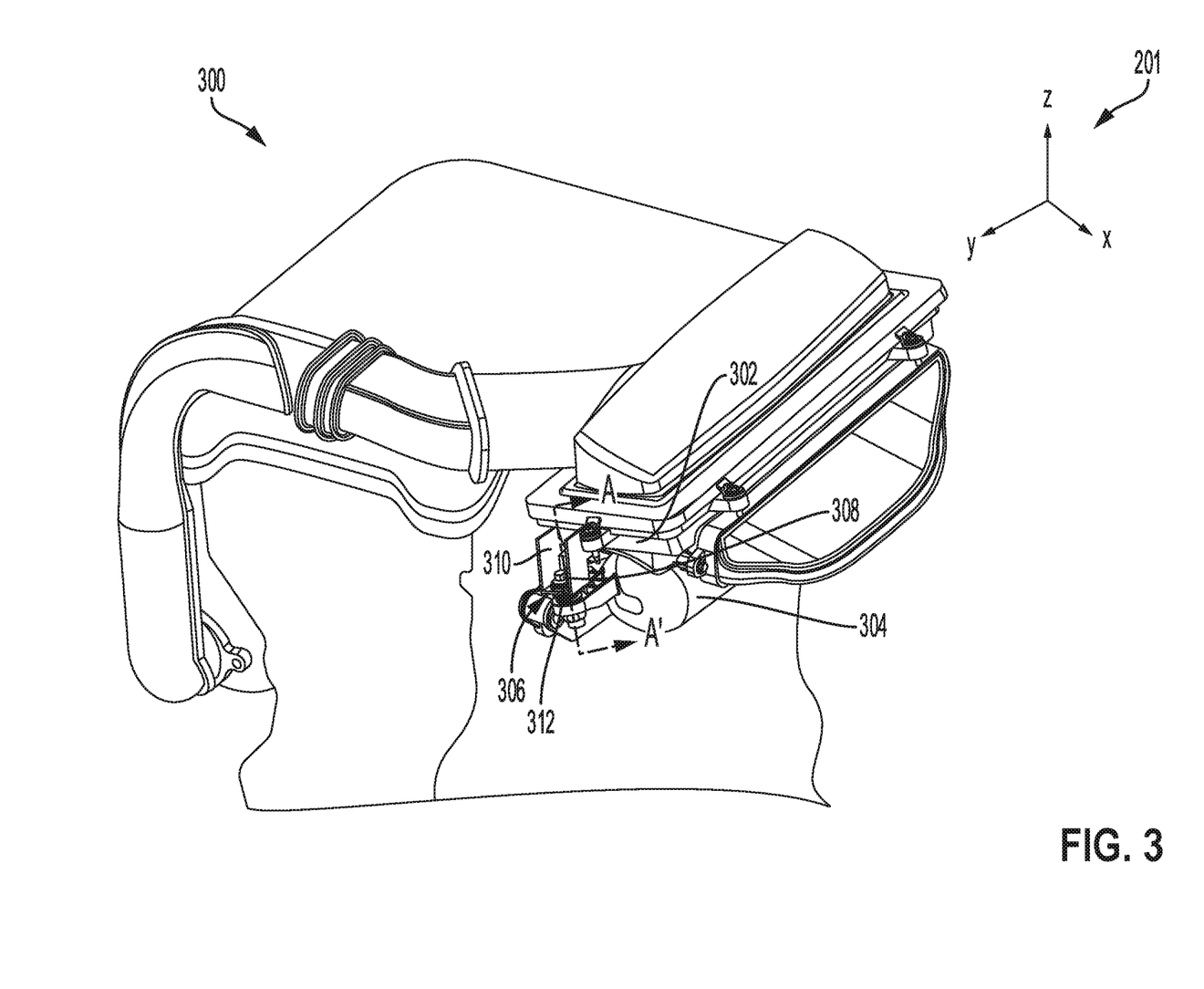
FIG. 3 shows an example of how the vibration isolation fastening assembly may be implemented in an engine.
Figure 4:
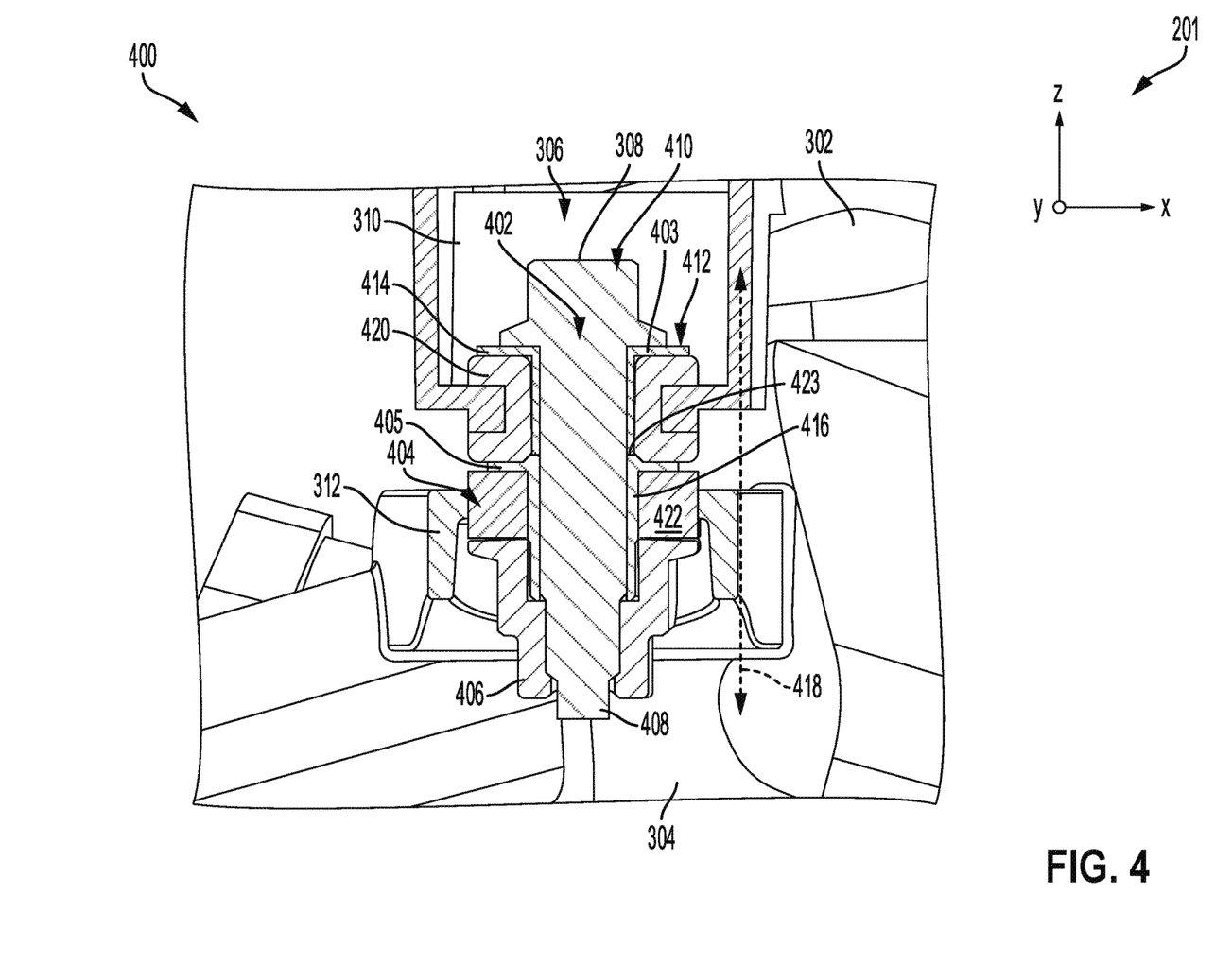
FIG. 4 shows a cross-section of a second example of a vibration isolation fastening assembly installed in the engine.
Figure 5:
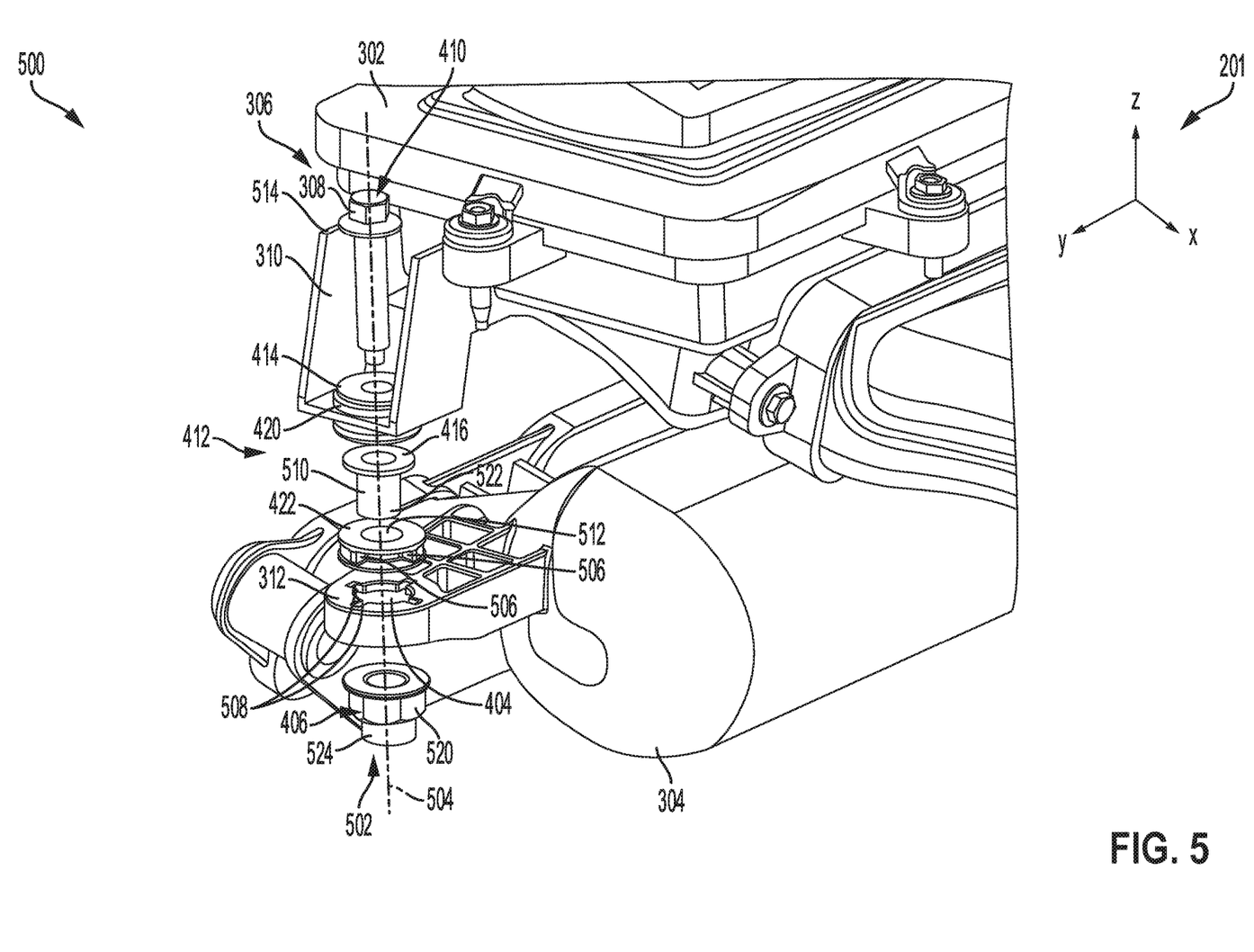
FIG. 5 shows an exploded view of the vibration isolation fastening assembly of FIG. 4.
Figure 6:
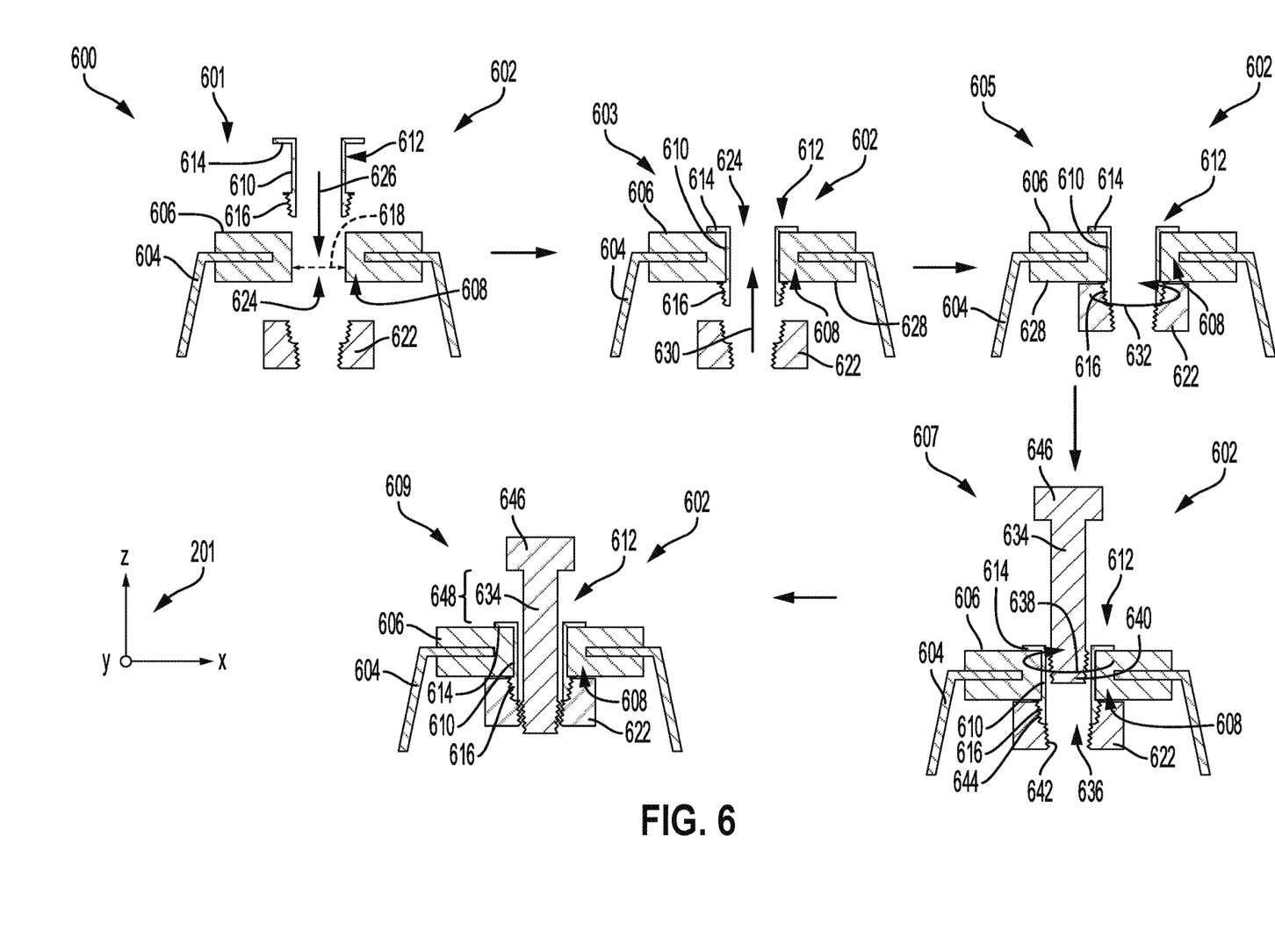
FIG. 6 shows an example of a process for assembling the vibration isolation fastening assembly.

The following description relates to systems and methods for a vibration isolation fastening (VIF) assembly. As one example, the VIF assembly may be implemented in an engine system of a vehicle to interrupt propagation of vibrations across engine components. An example of an engine system is shown in FIG. 1, the system includes an airbox and an intake manifold where at least of the airbox and the intake manifold may be formed from a composite material. In a front end compartment of the vehicle where space is restricted, the airbox and the intake manifold may be positioned adjacent to one another. In some examples, the airbox may be mounted to the intake manifold. However, transfer of oscillations generated by engine motion from the intake manifold to the airbox may degrade a structural integrity of the airbox when the airbox is formed from the composite material. It may therefore be desirable to use the VIF assembly to attach the airbox to the intake manifold and provide a spacer between the airbox and intake manifold to suppress propagation of vibrational energy without applying an excessive compressive force on the composite material. FIG. 2 shows a schematic diagram of a cross-section of an example of the VIF assembly. The VIF assembly may include an upper portion and a lower portion that is inserted through the composite material and configured to receive a fastener. The upper portion and lower portion of the VIF assembly may be pre-assembled in the composite material and prepared for mounting/attaching of components by feeding a fastener therethrough. An example of how the VIF assembly may be positioned in an engine to mount an airbox to an intake manifold is illustrated in FIG. 3. Detailed views of the VIF assembly installed in the engine are shown in FIGS. 4 and 5 in a cross-section and perspective view, respectively. A process for assembling the VIF assembly is depicted in FIG. 6, the process allowing the VIF assembly to be readily accessed and tightened by a tool during a final installation step of the VIF assembly.

FIGS. 2-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 depicts an example of a vehicle 5 including a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146 (which may be referred to herein as intake lines). In some examples, intake air passage 146 may be one of a plurality of passages of an intake manifold 90 of the engine 10, with each passage of the plurality of passages being coupled to a separate cylinder of the engine 10. Intake air passage 142 may be the most upstream intake air passage of the series of intake air passages shown in FIG. 1, and may include an airbox 92 at an inlet of the intake air passage 142.

The airbox 92 may be an empty chamber collecting air from outside the intake air passage 142 and feeding the air to the intake manifold 90. Cylinder 14 may be included in the intake manifold 90. In one example, the airbox 92 may be formed from a composite material and may be positioned directly adjacent to and mounted to the intake manifold 90. The airbox 92 may be connected to the intake manifold 90 by one or more vibration isolation fastening (VIF) assemblies 94, the VIF assemblies 94 extending through openings in a wall of the airbox 92 and interfacing with both the airbox 92 and the intake manifold 90. In addition to providing devices to secure the airbox 92 to the intake manifold 90, the VIF assemblies 94 may also absorb vibrations from the intake manifold 90, reducing an amount of oscillation transmitted to the airbox 92. Further details of the VIF assemblies 94 are discussed below with reference to FIGS. 2-6.

Although the VIF assemblies 94 are shown in FIG. 1 extending through the wall of the airbox 92, it will be appreciated that the VIF assemblies 94 may be coupled to a variety of engine components formed from different types of materials, e.g., metal, plastic, ceramic, etc. The VIF assemblies 94 may be used to mount various components to other nearby components or space components apart. Furthermore, the VIF assemblies 94 may be implemented in systems other than engine systems, including any systems equipped with parts or panels formed from composite materials.

In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from the fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc. In still another example, both fuels may be alcohol blends with varying alcohol composition wherein the first fuel type may be a gasoline alcohol blend with a lower concentration of alcohol, such as Eli) (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature. The controller 12 receives signals from the various sensors of FIG. 1 and employs the various actuators of FIG. 1 to adjust engine operation based on the received signals and instructions stored on a memory of the controller. For example, adjusting an amount of intake air flowing to the cylinder 14 via intake passage 146 may include adjusting a position of the throttle 162 (e.g., an amount of rotation of the throttle plate 164) in order to increase or decrease airflow from the intake passage 144 to the intake passage 146.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation. One or more components of the hybrid vehicle may include openings adapted to receive VIF assemblies, similar to the openings in the airbox 92 adapted to receive the VIF assemblies 94 as described above. An example of a VIF assembly is described below with respect to FIG. 2.

FIG. 2 shows a cross-section 200 of a VIF assembly 202. A set of reference axes 201 is provided, indicating a y-axis, an x-axis, and a z-axis. The VIF assembly 202 has a central axis 203 arranged parallel with the z-axis and includes an upper portion 204, a lower portion 206 arranged below the upper portion 204 with respect to the z-axis, and a fastener 208 extending along the central axis 203 through a central aperture 210 of the upper portion 204 and a central aperture 212 of the lower portion 206 of the VIF assembly 202.

The upper portion 204 of the VIF assembly 202 has an insert 214 that extends along the z-axis and along a portion of a length 216 of the fastener 208. In other words, a length 218 of the insert 214, defined along the z-axis, is shorter than the length 216 of the fastener 208. The insert 214 may be generally cylindrical with a circular cross-section, taken along the y-x plane, and may include a first lip 222 at a first end 220 of the insert 214 and a second lip 224 at a mid-point between the first end 220 and a second end 226 of the insert 214, the second end 226 opposite of the first end 220. The first lip 222 and the second lip 224 may be configured similarly, both extending perpendicularly outwards and away from a wall 228 of the insert 214, the wall 228 parallel with the central axis 203. A width 230 of the first lip 222 may be similar to a width of the second lip 224, the widths defined along the x-axis. Cross-sections of both the first lip 222 and the second lip 224 may be annular, when taken along line A-A' along the y-x plane, as shown in insert 232.

The insert 214 may be an element of the VIF assembly 202 that allows the VIF assembly to be coupled to more than one engine component. For example, the insert 214 may have a first section, or first compression limiter 238, extending from the first end 220 of the insert 214 that includes the first lip 222, to a point immediately above the second lip 224, along the z-axis, and a second section, or second compression limiter 240, that includes the second lip 224 and extends from the second lip 224 to the second end 226 of the insert 214. The first compression limiter 238 and the second compression limiter 240 may be two separate pieces of the insert 214. The first compression limiter 238 may be removably coupled to, e.g., in contact with but not fixed to, the second compression limiter 240 at a joint 243. The joint 243 may be an interface between the first compression limiter 238 and the second compression limiter 240 of the insert 214 where the sections are maintained in contact with one another by a compressive force exerted by the fastener 208 when the fastener 208 is inserted through the insert 214 and engaged with the lower portion 206 of the VIF assembly 202, as described further below.

The insert 214 may be formed from a rigid, durable material, such as steel. Dimensions of the insert 214 may vary depending on sizes of the more than one engine component to which the VIF assembly 202 may be coupled. For example, in larger components more prone to large oscillations, the insert 214 may be wider than in smaller components. The length 218 of the insert 214 may vary depending on thicknesses of component surfaces.

The first compression limiter 238 of the insert 214 may interface with a mounting gasket 234 coupled to a first engine component formed from a composite material, such an airbox (e.g., airbox 92 of FIG. 1). In one example, the mounting gasket 234 may be shaped to fit between the first lip 222 and the second lip 224, e.g., a height 236 of the mounting gasket 234 may be similar to or less than a distance between the first lip 222 and the second lip 224 along the z-axis. The positioning of the mounting gasket 234 between the first lip 222 and the second lip 224 may inhibit motion of the insert 214 along the z-axis. The mounting gasket 234 may be configured as a ring of a material more flexible than the material of the insert 214, such as rubber, that may be overmolded to an opening 242 in a surface 244 of the airbox. The mounting gasket 234 thereby envelops the edges of the opening 242 in the surface 244 of the airbox, arranged between the surface 244 of the airbox and the insert 214. The surface 244 of the airbox and the mounting gasket 234 are illustrated in FIG. 2 with dashed outlines to indicate that these elements are not incorporated into the VIF assembly 202 but instead engaging indirectly (e.g., the surface 244 of the airbox) or directly (e.g., the mounting gasket 234) with the VIF assembly 202.

A diameter 246 of a central aperture 248 of the mounting gasket 234 may be similar to or slightly smaller than a diameter, defined along the x-axis, of the insert 214 between the first lip 222 and the second lip 224. The similar or slightly smaller diameter 246 of the central aperture 248 of the mounting gasket 234 and the flexibility of the material of the mounting gasket 234 allows the first compression limiter 238 of the insert 214 to be snugly and circumferentially surrounded and held in place by a inwards (e.g., toward the central axis 203) compressive force exerted on the insert 214 by the mounting gasket 234.

The second compression limiter 240 of the insert 214 may interface with an isolator 250, similarly configured as the mounting gasket 234 as a ring of a material that is softer, e.g., less stiff than, the material of the insert 214. In one example, the isolator 250 may be formed from a material that absorbs and dampens vibrations, such as rubber, ethylene propylene diene terpolymer (EPDM), a thermoplastic vulcanizate, or silicone. A positioning of the isolator 250 within the VIF assembly 202 may allow the isolator 250 to be situated between two components coupled together by the VIF assembly 202. For example, the isolator 250 may be arranged between the airbox and an intake manifold of the engine, thereby absorbing vibrations from the intake manifold and reducing transmission of the vibrational motion to the airbox.

The isolator 250 may circumferentially surround the second compression limiter 240 of the insert 214, between the second lip 224 and a threaded region 252 at the second end 226 of the second compression limiter 240. A diameter of a central aperture 254 of the isolator 250 may be similar to the diameter 246 of the mounting gasket 234 but an outer diameter 256 of the isolator 250 may be wider than an outer diameter 258 of the mounting gasket 234. However, in other examples, the outer diameter 256 of the isolator 250 may be similar to or narrower than the outer diameter 258 of the mounting gasket 234. Furthermore, a height 260 of the isolator 250 is taller than the height 236 of the mounting gasket 234 in FIG. 2 but may be similar in height or shorter than the mounting gasket 234 in other examples.

The height 260 of the isolator 250 may be similar to a distance, along the z-axis, between the second lip 224 and the threaded region 252 of the second compression limiter 240 of the insert 214. The threaded region 252 of the second compression limiter 240 may be thicker, as defined along the x-axis, and may extend outwards, away from the central axis 203, from an inner surface 262 of the second compression limiter 240 of the insert 214 by a greater distance than a portion of the second compression limiter 240 between the second lip 224 and the threaded region 252. Thus, the outwards protrusion of the threaded region 252 below the isolator 250 and the presence of the second lip 224 above the isolator 250, with respect to the z-axis, inhibits motion of the isolator 250 along the z-axis relative to the insert 214. The similarity of the diameter 246 of the central aperture 254 of the isolator 250 to the diameter of the insert 214, between the second lip 224 and the threaded region 252, reduces rotation of the isolator 250 relative to the insert 214 by friction generated between the isolator 250 and surface of the second compression limiter 240 of the insert 214 and/or by an inwards compressive force exerted on the insert 214 by the isolator 250 when the diameter 246 of the central aperture 254 of the isolator is slightly smaller than the diameter of the second compression limiter 240 of the insert 214, between the second lip 224 and the threaded region 252.

In some examples, the isolator 250 and the second compression limiter 240 of the insert 214 may have additional elements to maintain the isolator 250 stationary relative to the insert 214. As one example, an outer surface of the second compression limiter 240 of the insert 214 that interfaces with the isolator 250 may be configured with splines (not shown) that couple to matching grooves in the isolator 250. For example, a lower surface 266 of the second lip 224 may have splines protruding downwards, along the z-axis from the lower surface 266 and extending along the lower surface in a radially outwards, e.g., away from the central axis 203, direction. The isolator 250 may have grooves shaped to receive the splines, extending downwards, along the z-axis, from an upper surface 268 of the isolator 250. The radial extension of the splines and grooves thereby inhibits rotation of the isolator 250 about the insert 214. Alternatively, the portion of the second compression limiter 240 of the insert 214 between the second lip 224 and the threaded region 252 may have splines protruding outwards from an outer surface 270 of the second compression limiter 240 and extending along the outer surface parallel with the central axis 203. Complementary grooves in an inner side surface 272 of the isolator 250 may similarly resist rotation of the isolator 250 around the insert 214.

The isolator 250 may be optionally overmolded to an intake manifold doghouse 274, shown in dashed lines to indicate that the doghouse 274 is an external component from the VIF assembly 202. The doghouse 274 may be a boss attached or integral to a region of the intake manifold adapted to allow coupling of the intake manifold to the airbox via fasteners. In other examples, the isolator 250 may not be overmolded to the doghouse 274 and instead fit flush within an opening 276 of the doghouse 274 and held in place by compressive forces, e.g., compressing inwards, towards the central axis 203, exerted on the more flexible material of the isolator 250 by the doghouse 274.

The lower portion 206 of the VIF assembly 202 may be positioned directly below the isolator 250, with respect to the z-axis. The lower portion 206 may be a nut, formed of steel, for example, and configured to interface with the threaded region 252 of the second end 226 of the insert 214 and with a threaded end 278 of the fastener 208. An inner surface 280 of the lower portion 206 of the VIF assembly 202 that directly engages with the threaded region 252 of the second end 226 of the insert 214 and the threaded end 278 of the fastener 208 may be tiered to accommodate different outer diameters of the insert 214 and the fastener 208. The inner surface 280 of the lower portion 206 may be threaded and may include a first tier 282 arranged above a second tier 284, with respect to the z-axis.

The first tier 282 may have a first diameter 286 that is similar to the outer diameter of the threaded region 252 of the second end 226 of the insert 214. The threading of the first tier 282 may be configured to mate with the threading of the threaded region 252 of the insert 214. For example, when viewing the VIF assembly along the z-axis, from the first lip 222 of the insert 214 towards the lower portion 206, the threading of the threaded region 252 of the insert 214 may spiral clockwise. The threading of the first tier 282 of the lower portion 206 may also spiral clockwise to allow the first tier 282 of the lower portion 206 to be tightly coupled to the threaded region 252 of the insert 214 by rotating the lower portion 206 counter-clockwise while engaging with the threaded region 252. Further insertion of the threaded region 252 of the insert 214 into the first tier 282 of the lower portion 206 is halted by contact between the second end 226 of the insert 214 and a step 288 in the inner surface 280 of the lower portion 206 between the first tier 282 and the second tier 284.

The step 288 may be a transition in the inner surface 280 of the lower portion 206 from the first tier 282 to the second tier 284. The second tier 284 may have a second diameter 290 that is narrower than the first diameter 286. The threading of the second tier 284 is configured to mate with threading at the threaded end 278 of the fastener 208. Furthermore, a direction of the threading is adapted to oppose the threading direction of the first tier 282 (and the threaded region 252 of the second end 226 of the insert 214) so that when the fastener 208 is rundown into the insert 214 (e.g., rotated to engage with the lower portion 206 of the insert 214), tightening of the fastener 208 against the second tier 284 of the lower portion 206 simultaneously tightens the coupling between the first tier 282 and the threaded region 252 of the insert 214. For example, as described above, the threading of the first tier 282 and the threaded region 252 of the insert 214 may spiral clockwise when viewed along the z-axis, from the first lip of the insert 214 towards the lower portion 206. The threading of the second tier 284 and the threaded end 278 of the fastener 208 may instead spiral counter-clockwise. To engage the fastener 208 with the lower portion 206 of the VIF assembly 202, the fastener 208 may be rotated counter-clockwise as the fastener 208 engages with the lower portion 206 of the insert 214. Rotation of the lower portion 206 in the counter-clockwise direction as the fastener 208 is tightened within the lower portion 206 drives tightening of the first tier 282 of the lower portion 206 around the threaded region 252 of the second end 226 of the insert 214. Furthermore, tightening of the fastener 208 within the lower portion 206 exerts a compressive force on the VIF assembly 202 along the z-axis, as shown by arrows 295. The first compression limiter 238 and the second compression limiter 240 of the insert 214, may together resist the compressive force (e.g., resist an axial compressive force), maintaining a structural integrity of the VIF assembly 202 along the z-axis. Thus the reversed threading directions of the first tier 282 and the second tier 284 enhances a securing of the VIF assembly 202 to coupled components when the fastener 208 is rundown.

In other examples, the VIF assembly 202 may be adapted with a press-fit connection where coupling of the lower portion 206 of the VIF assembly 202 to the second end 226 of the insert 214 is enabled by a pressing the insert 214 into the lower portion 206. As such, the second end 226 of the insert 214 may not have the threaded region 252 and instead have a smooth surface. The inner surface 280 of the first tier 282 may also be smooth and un-threaded, configured to receive the second end 226 of the insert 214 with a tight fit so that a force is applied along the z-axis to the insert 214 and the lower portion 206 in order to insert the second end 225 of the insert 214 securely into the first tier 282 of the lower portion 206. Rundown of the fastener 208 similarly compresses the VIF assembly along the z-axis, as indicated by arrows 295.

The fastener 208 may be a bolt formed from a tough, durable material, such as a metal. The fastener 208 may be cylindrical in shape and sufficiently long to be inserted entirely through the lower and upper portions 204, 206 of the VIF assembly 202. A head 292 of the fastener 208 may be wider in diameter, defined along the x-axis, than a body 294 of the fastener 208, the body 294 extending through the insert 214 and the lower portion 206 of the VIF assembly 202. The wider diameter of the head 292 allows the head 292 to halt insertion of the fastener 208 into the VIF assembly 202 when the head 292 contacts the first lip 222 of the insert 214.

The head 292 of the fastener 208 may be configured to receive a tool to drive tightening of the fastener 208 into the VIF assembly 202. As an example, a top surface 296 of the head 292 may include a slot for receiving a screwdriver or a hexagonal recess for receiving a hex key. In another example, the head 292 may be shaped with flat sides, e.g., the head 292 may be hexagonal, square, etc. when viewed along the z-axis, and may be rotated with a wrench or a socket. Various other methods for tightening the fastener 208 are possible to achieve secure coupling of the fastener 208 to the VIF assembly 202.

As described above, a VIF assembly, such as the VIF assembly 202 of FIG. 2, may be implemented in an engine to couple or mount components to one another and reduce transmission of vibrations from one component to another. For example, an engine 300 is shown in FIG. 3, including an airbox 302 and an intake manifold 304. In one example, the engine 300 may be the engine 10 of FIG. 1. The airbox 302 may be positioned above the intake manifold 304, with respect to the z-axis, and mounted onto the intake manifold 304 via at least one VIF assembly 306. As an example, the VIF assembly 306 may be similar to the VIF assembly 202 of FIG. 2.

A head 308 of a fastener (shown in FIG. 4) of the VIF assembly 306 is shown in FIG. 3, protruding from a set of openings through a bracket 310 of the airbox 302 and a doghouse 312 of the intake manifold 304. The bracket 310 may be integrated into a surface of the airbox 302 and the doghouse 312 may be integrated into a surface of the intake manifold 304 so that attaching the bracket 310 to the doghouse 312 secures the airbox 302 to the intake manifold 304. Details of the interaction of the VIF assembly 306 is shown in a cross-section 400 depicted in FIG. 4, taken along line A-A' shown in FIG. 3.

As shown in FIG. 4, the VIF assembly 306 extends through an opening 402 in the bracket 310 of the airbox 302 and an opening 404 in the doghouse 312 of the intake manifold 304. The doghouse 312 may enclose a lower portion 406 of the VIF assembly 306 configured to receive a second end 408 of a fastener 410, the second end 408 opposite of the head 308 of the fastener 410. An insert 412, including a first compression limiter 414 positioned above a second compression limiter 416, relative to the z-axis, surrounds the fastener 410 along at least a portion of a length 418 of the fastener 410.

A mounting gasket 420 may surround the opening 402 of the bracket 310 of the airbox 302 and wrap around surfaces of the bracket 310 at the opening 402. The first compression limiter 414 of the insert 412 extends through the opening 402 of the bracket 310 and is spaced away along the x-axis from a surface of the bracket 310 at the opening 402 of the mounting gasket 420. The mounting gasket 420 is in face-sharing contact with surfaces of the bracket 310 and an outer surface of the first compression limiter 414 of the insert 412, extending between a first lip 403 and a second lip 405 of the insert 412 along the z-axis. The second compression limiter 416 of the insert 412 may interface with the first compression limiter 414 at a joint 423. The second compression limiter 416 extends through the opening 404 of the doghouse 312 and into the lower portion 406 of the VIF assembly 306 along the z-axis. The second compression limiter 416 of the insert 412 is spaced away, along the x-axis, from a surface of the doghouse 312 at the opening 404 by an isolator 422. The isolator 422 is in face-sharing contact with the surface of the doghouse 312 at the opening 404 and an outer surface of the second compression limiter 416 of the insert 412 and extends between the second lip 405 and the lower portion 406 of the VIF assembly 306 along the z-axis.

A stacking of components of the VIF assembly 306 is shown in an exploded view 500 in FIG. 5. A common, central aperture 502 extends along a central axis 504 of the VIF assembly 306, through a central region of the components of the VIF assembly 306 as well as through the bracket 310 (e.g., the opening 402 of the bracket 310) and the doghouse 312 (e.g., the opening 404 of the doghouse 312). The isolator 422 has a plurality of radial splines 506 that interface with a plurality of grooves 508 in the opening 404 of the doghouse 312 to inhibit rotation of the isolator 422 with the opening 404 when the fastener 410 is rundown. As described above, an outer surface 510 of the second compression limiter 416 of the insert 412 may also include splines that couple to matching grooves (not shown in FIG. 5) in an inner surface 512 of the isolator 422 to resist rotation of the second compression limiter 416 of the insert 412 relative to the isolator 422.

By inhibiting rotation of the insert 412 and pre-assembling components of the VIF assembly 306 coupled to the intake manifold 304 and the airbox 302, the VIF assembly 306 may provide secure attachment of the airbox 302 to the intake manifold 304 using a single tool applied to the head 308 of the fastener 410. As shown in FIG. 5, in examples where the VIF assembly 306 is press-fit instead of threaded, the insert 412 is pushed into a first tier 520 of the lower portion 406 that is not threaded at a lower end 522 of the insert 412 that is also not threaded. The fastener 410 is fed through the VIF assembly 306 and rotated to engage with threading of a second tier 524 of the lower portion, stacked below the first tier 430, without application of a tool to hold the lower portion 406 stationary. The VIF assembly 306 is thus readily installed even in constrained spaces with little leeway for access to the VIF assembly 306 with an installation tool. For example, the fastener 410 may be rundown by a socket positioned directly overhead of the fastener 410 and rotated until a desired resistance to further rotation of the fastener 410 is detected.

When the insert 412 is configured to couple with the lower portion 406 of the VIF assembly 306 via threading, a reverse configuration of threading between the first tier 520 and the second tier 524 of the lower portion 406 of the VIF assembly 306, as described above with reference to FIG. 2, along with resistance of the insert 412 to rotation, enables tightening of the fastener 410 in the VIF assembly 306 similarly without use of an additional tool to hold the lower portion 406 during fastener rundown.

In addition, a protrusion of the VIF assembly 306 from surfaces of the airbox 302 at the bracket 310 and the doghouse 312 of the intake manifold 304 is small and unobtrusive. For example, the head 308 of the fastener 410 may not extend above, relative to the z-axis, a top edge 514 of the bracket 310 shown in FIG. 5. The positioning of the VIF assembly 306 through openings in the airbox 302 and the intake manifold 304 at coupling surfaces of the components thereby does not block access to adjacent engine components, such as a fuel line or fuel rail. Furthermore, implementation of the VIF assembly 306 allows use of a fastener with a low profile, e.g., the fastener 410 of FIGS. 4 and 5, an amount of space occupied by the VIF assembly 306 compared to other fasteners configured with more prominent fastener heads to enable fastener rundown.

Additionally, the airbox 302 and intake manifold 304 may be configured to crush and thereby absorb energy during forceful impact to the airbox 302 and/or the intake manifold 304. An amount of impact absorption provided by the airbox 302 and/or the intake manifold 304 may include crushing of the components up to a defined plane, relative to the fuel rail, e.g., a crash crush plane. The components may be configured to inhibit crushing beyond the crash crush plane. By positioning the VIF assembly 306 at specific regions of the components within the crash crush plane, the VIF assembly 306 may provide additional structural support to the airbox 302 and intake manifold 304 and enable greater resistance to crushing.

A configuration of a VIF assembly, such as the VIF assembly 202 of FIG. 2 and 306 of FIGS. 3-5, may enable installation of the VIF assembly into a component formed from a composite material without pushing elements of the VIF assembly through the composite material and increasing a likelihood of material fatigue. By dividing an insert of the VIF assembly into two sections, each section may be inserted into an opening in a surface of a component without exerting excessive force. The two sections may be attached once installed in each surface, allowing the VIF assembly to both dampen oscillations transmitted through at least one surface and couple the surfaces to one another. Rundown of a fastener through the VIF assembly allows securing of the coupling.

The VIF assembly may be at least partially assembled during a manufacturing process to simplify a final installation step when fully assembly is desired. An example of an assembly process 600 that may be utilized during manufacturing of components of a system, such as an intake manifold of an engine, is depicted in FIG. 6. A partial configuration of a VIF assembly 602, used similarly as the VIF assembly 202 of FIG. 2 and 306 of FIGS. 3-5 is shown in FIG. 6 for simplicity, e.g., the first compression limiter 238 of the insert 214 and the mounting gasket 234 of the VIF assembly 202 of FIG. 2 are omitted but installation of the omitted elements will be included in the following description.

An intake manifold doghouse 604 is shown in process 600 with an isolator 606, formed of a more flexible material than the doghouse 604, that may be overmolded to surfaces of the doghouse 604 surrounding an opening 608 of the doghouse 604. In other examples, however, the isolator 606 may be molded to an outer surface of a second compression limiter 610 of an insert 612 of the VIF assembly 602, extending between a lip 614 of the second compression limiter 610 and a threaded region 616 of the second compression limiter 610, instead of the doghouse 604. In such a configuration, the isolator 606 may have a narrower diameter, similar to a diameter 618 of the opening 608 of the doghouse 604.

At 601 of the process 600, the isolator 606 is coupled to the doghouse 604 but the second compression limiter 610 of the insert 612 and a lower portion 622 of the VIF assembly 602 are not assembled. As described above with reference to FIGS. 2-5, the lower portion 622 may be a tiered nut formed from rigid, durable material such as a metal. The second compression limiter 610 of the insert 612 may be inserted into a central aperture 624 of the isolator 606, as indicated by arrow 626.

At 603 of the process 600, the second compression limiter 610 of the insert 612 is installed in the central aperture 624 of the isolator 606 so that the threaded region 616 protrudes beyond a lower surface 628 of the isolator 606. The lower portion 622 of the VIF assembly 602 may be engaged with the threaded region 616 of the insert 612 by moving the lower portion 622 upwards, as indicated by arrow 630 until a first set of threading 644 of the lower portion 622 comes into contact with the threaded region 616 of the insert 612. The lower portion 622 may be rotated in a first direction, as indicated by arrow 632 at 605 of process 600, using a tool such as a wrench. The lower portion 622 may be rotated along the first direction, tightening the lower portion 622 against the second compression limiter 610 of the insert 612 and simultaneously driving upwards movement of the lower portion 622 until the lower portion 622 comes into contact with the lower surface 628 of the isolator 606.

At 607 of the process 600, a fastener 634, such as a bolt, may be inserted into an inner passage 636 of the second compression limiter 610 of the insert 612 and rotated in a second direction, opposite of the first direction, as indicated by arrow 638. Rotating the fastener 634 in the second direction as the fastener 634 is inserted into the second compression limiter 610 of the insert 612 allows a threaded end 640 of the fastener to engage with a second set of threading 642 of the lower portion 622. The second set of threading 642 is positioned below, with respect to the z-axis, the first set of threading 644 of the lower portion 622 that engages with the threaded region 616 of the insert 612. The first set of threading 644 and the second set of threading 642 may be oppositely threaded, e.g., spiral in opposite directions. The fastener 634 may be rotated by applying a tool such as a wrench, a socket, a screwdriver, etc., to a head 646 of the fastener 634.

In process 600, steps included in 601, 603, and 605 may be performed during production of one component, e.g., the intake manifold, in which the VIF assembly 602 is to be installed. Insertion of the fastener 634 at 607 may occur during compilation of engine components within a front end of a vehicle as a final operation to secure or mount a second component to the intake manifold. The second component may be an airbox, positioned above the intake manifold in the vehicle front end. A first compression limiter of the insert 612, e.g., the first compression limiter 238 of the insert 214 of FIG. 2, may be positioned in a space between the second compression limiter 610 of the insert 612 and the head 646 of the fastener 634, as indicated by bracket 648 at 609 of process 600.

Prior to inserting the fastener 634, the first compression limiter of the insert 612 may be inserted into an opening in a bracket of the airbox in a similar manner as 601 of process 600. The opening of the bracket of the airbox may be overmolded with a mounting gasket, such as the mounting gasket 234 of FIG. 2 or the mounting gasket 420 of FIGS. 4 and 5, the mounting gasket formed of a more flexible material than the bracket and surrounding edges of the opening of the bracket, as shown in FIGS. 2, 4, and 5. During compilation of engine components in the front end of the vehicle, the first compression limiter of the insert 612 may be inserted through the mounting gasket and contact the second compression limiter 610 of the insert 612. The fastener 634 may then be inserted through both the first section and the second compression limiter 610 of the insert 612 to achieve a final assembly, shown in partial configuration at 609 of process 600 and in full configuration in FIGS. 2 and 4.

In this way, two components, at least one of the components formed from a composite material, may be coupled to one another by a vibration isolation fastening (VIF) assembly. The VIF assembly includes an upper portion, a lower portion, a dampening member, and a fastener. The upper portion may be comprise more than one sections and may be inserted through aligned openings in surface of the components. The lower portion may be tiered, engaging with the upper portion at a first tiered region and with the fastener at a second tiered region. When coupled via threading, a threading of the first tiered region may be opposite of a threading at the second tiered region, thereby enabling rundown of the fastener through the upper and lower portions of the VIF assembly without loosening engagement of the lower portion with the upper portion. The dampening member may be coupled to the upper portion of the VIF assembly and arranged between the two components, inhibiting transmission of vibrations propagated through at least one component to the other component and spacing the components away from one another. The VIF assembly may be at least partially assembled during manufacturing of the components to allow the components to be readily coupled by inserting the fastener through the upper and lower portions of the VIF assembly using an installation tool applied to a top of the fastener. A pre-assembly of the upper and lower portions allows the fastener to be rundown and tightened without using an additional tool to maintain the upper and lower portions stationary. Furthermore the pre-assembly may also include inserting separate segments of the upper portion through openings of the components adapted with flexible elements, thereby reducing wear on the composite material when the VIF assembly is installed and fully assembled, prolonging a life of the composite component. As a result, material fatigue caused by transfer of high frequency oscillations between components is reduced while providing a fastening system that is readily implemented in areas with constrained packaging space and efficiently couples components.

A technical effect of equipping an engine with the vibration isolation fastening assembly is that components may be coupled to one another without transmission of vibrations or noise radiation across components. Furthermore the vibration isolation fastening assembly may provide high resistance to normal forces pulling the assembly out of the component surfaces as well as resistance to axial forces causing fatigue-induced stress in the component surfaces.

In a first embodiment, a vehicle fastening assembly includes an upper portion divided between a first section and a second section, a lower portion arranged vertically below the upper portion and configured to couple to the second section of the upper portion, a dampening member circumferentially surrounding the second section of the upper portion, and a fastener configured to be inserted through both the upper portion and the lower portion and engage with the lower portion of the fastening assembly. In a first example of the assembly, the first section of the upper portion is configured to couple to an opening in a first component and the second section of the upper portion is configured to couple to an opening in a second component. A second example of the assembly optionally includes the first example, and further includes, wherein the first section of the upper portion and the second section of the upper portion are separate pieces and wherein the first section is positioned vertically above the second section. A third example of the assembly optionally includes one or more of the first and second examples, and further includes, wherein the first section of the upper portion has a lip extending radially outwards, away from a central axis of the fastening assembly, at an upper end of the first section and the first section couples to the second section of the upper portion at a lower end of the first section, the lower end opposite of the upper end. A fourth example of the assembly optionally includes one or more of the first through third examples, and further includes, wherein the second section of the upper portion has a lip extending radially outwards at an upper end of the second section and has a threaded region at a lower end of the second section and wherein the dampening member extends between the lip and the threaded region. A fifth example of the assembly optionally includes one or more of the first through fourth examples, and further includes, wherein an inner surface of the lower portion is tiered and includes a first tier with a first set of threading and a second tier with a second set of threading and wherein the first tier has a wider diameter than the second tier. A sixth example of the assembly optionally includes one or more of the first through fifth examples, and further includes, wherein the first set of threading of the first tier of the lower portion is configured to couple with the threaded region of the second section of the upper portion and the second set of threading of the second tier is configured to couple with a threaded end of the fastener. A seventh example of the assembly optionally includes one or more of the first through sixth examples, and further includes, wherein the first set of threading of the first tier of the lower portion spirals in an opposite direction from the second set of threading of the second tier. An eighth example of the assembly optionally includes one or more of the first through seventh examples, and further includes, wherein an inner surface of the lower portion is tiered and includes a first tier with a smooth surface and a second tier with a threaded surface and wherein the first tier is configured to receive an end of the second section of the upper portion and tightly surround the end of the second section. A ninth example of the assembly optionally includes one or more of the first through eighth examples, and further includes, wherein the dampening member is formed from a more flexible material than the upper portion, lower portion, and fastener.

In another example, a fastening system includes an insert including a first piece and a second piece, the first piece stacked vertically above the second piece, a tiered receiving portion configured to engage with one end of the second piece of the insert and with a bolt extending through the insert, and a vibration absorbing element circumferentially surrounding the second piece of the insert. In a first example of the system, a first engine component is arranged vertically above a second engine component, the second engine component coupled to a second region of the engine generating higher frequency vibrations than a first region of the engine coupled to the first engine component, and wherein the first piece of the insert is adapted to extend through an opening in the first engine component and the second piece of the insert is adapted to extend through an opening in the second engine component. A second example of the system optionally includes the first example, and further includes, wherein the opening of the first engine component has a gasket surrounding edges of the opening and interfacing with an outer surface of the first piece of the insert, wherein the first component is an airbox and the second component is an intake manifold. A third example of the system optionally includes one or more or the first and second examples, and further includes, wherein the vibration absorbing element is overmolded to surfaces of the opening of the second engine component. A fourth example of the system optionally includes one or more of the first through third examples, and further includes, wherein the vibration absorbing element is coupled to an outer surface of the second piece of the insert and wherein the vibration absorbing element has grooves configured to receive splines arranged along an outer surface of the second piece of the insert. A fifth example of the system optionally includes one or more of the first through fourth examples, and further includes, wherein at least one of the first and second engine components is formed from a composite material.

In another embodiment, a method for manufacturing a fastening assembly includes inserting a first section of an upper portion of the fastening assembly through an opening in a first component of a vehicle, inserting a second section of the upper portion of the fastening assembly through an opening in a second component of the vehicle, the second section configured to be coupled to the first section and positioned vertically below the first section, coupling a lower portion of the fastening assembly to a threaded region of the second section of the upper portion, and inserting a fastener through an inner passage extending through both the first and second sections of the upper portion and through the lower portion and engaging the fastener with the lower portion. In a first example of the method, wherein inserting the first section of the upper portion through the opening in the first component includes feeding the first section through a gasket surrounding an edge of the opening, the gasket formed of a flexible material. A second example of the method optionally includes the first example, and further includes, wherein inserting the second section of the upper portion through the opening in the second component includes positioning the second section within the opening and spacing an outer surface of the second section away from an edge of the opening by a vibration isolating member, the vibration isolation member formed of a flexible material. A third example of the method optionally includes one or more of the first and second examples, and further includes, wherein engaging the fastener with the lower portion includes applying a tool to a head of the fastener to rotate the fastener and wherein rotating the fastener compresses the fastening assembly along a vertical axis.

In another representation a vibration isolating device for an engine includes an insert configured to be inserted through openings in two or more components, a tiered nut configured to mate with one end of the insert at a first tiered region, a fastener extending through the insert and configured to engage with a second tiered region of the tiered nut, and a vibration isolating element coupled to an exterior surface of the insert and positioned between the two or more components.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle fastening assembly, comprising;
   an upper portion divided between a first section and a second section, the first section configured to couple to an opening in a first component and the second section configured to couple to an opening in a second component;
   a lower portion arranged vertically below the upper portion and configured to couple to the second section of the upper portion;
   a dampening member circumferentially surrounding the second section of the upper portion; and
   a fastener configured to be inserted through both the upper portion and the lower portion and engage with the lower portion of the fastening assembly.

2. The vehicle fastening assembly of claim 1, wherein the first section of the upper portion and the second section of the upper portion are separate pieces and wherein the first section is positioned vertically above the second section.

3. The vehicle fastening assembly of claim 2, wherein the first section of the upper portion has a lip extending radially outwards, away from a central axis of the fastening assembly, at an upper end of the first section and the first section couples to the second section of the upper portion at a lower end of the first section, the lower end opposite of the upper end.

4. The vehicle fastening assembly of claim 3, wherein the second section of the upper portion has a lip extending radially outwards at an upper end of the second section and has a threaded region at a lower end of the second section and wherein the dampening member extends between the lip and the threaded region.

5. The vehicle fastening assembly of claim 4, wherein an inner surface of the lower portion is tiered and includes a first tier with a first set of threading and a second tier with a second set of threading and wherein the first tier has a wider diameter than the second tier.

6. The vehicle fastening assembly of claim 5, wherein the first set of threading of the first tier of the lower portion is configured to couple with the threaded region of the second section of the upper portion and the second set of threading of the second tier is configured to couple with a threaded end of the fastener.

7. The vehicle fastening assembly of claim 6, wherein the first set of threading of the first tier of the lower portion spirals in an opposite direction from the second set of threading of the second tier.

8. The vehicle fastening assembly of claim 1, wherein an inner surface of the lower portion is tiered and includes a first tier with a smooth surface and a second tier with a threaded surface and wherein the first tier is configured to receive an end of the second section of the upper portion and tightly surround the end of the second section.

9. The vehicle fastening assembly of claim 1, wherein the dampening member is formed from a more flexible material than the upper portion, lower portion, and fastener.

10. A fastening system for an engine, comprising;
an insert including a first piece and a second piece, the first piece stacked vertically above the second piece;
a receiving portion with a tiered inner surface, the receiving portion configured to engage with one end of the second piece of the insert and with a bolt extending through the insert; and
a vibration absorbing element circumferentially surrounding the second piece of the insert.

11. The fastening system of claim 10, further comprising a first engine component arranged vertically above a second engine component, the second engine component coupled to a second region of the engine generating higher frequency vibrations than a first region of the engine coupled to the first engine component, and wherein the first piece of the insert is adapted to extend through an opening in the first engine component and the second piece of the insert is adapted to extend through an opening in the second engine component.

12. The fastening system of claim 11, wherein the opening of the first engine component has a gasket surrounding edges of the opening and interfacing with an outer surface of the first piece of the insert, wherein the first engine component is an airbox and the second engine component is an intake manifold.

13. The fastening system of claim 12, wherein the vibration absorbing element is overmolded to surfaces of the opening of the second engine component.

14. The fastening system of claim 12, wherein the vibration absorbing element is coupled to an outer surface of the second piece of the insert and wherein the vibration absorbing element has grooves configured to receive splines arranged along an outer surface of the second piece of the insert.

15. The fastening system of claim 11, wherein at least one of the first and second engine components is formed from a composite material.

16. A method for manufacturing a fastening assembly, comprising;
inserting a first section of an upper portion of the fastening assembly through an opening in a first component of a vehicle;
inserting a second section of the upper portion of the fastening assembly through an opening in a second component of the vehicle, the second section configured to be coupled to the first section and positioned vertically below the first section;
coupling a lower portion of the fastening assembly to a threaded region of the second section of the upper portion; and
inserting a fastener through an inner passage extending through both the first and second sections of the upper portion and through the lower portion and engaging the fastener with the lower portion.

17. The method of claim 16, wherein inserting the first section of the upper portion through the opening in the first component includes feeding the first section through a gasket surrounding an edge of the opening, the gasket formed of a flexible material.

18. The method of claim 16, wherein inserting the second section of the upper portion through the opening in the second component includes positioning the second section within the opening and spacing an outer surface of the second section away from an edge of the opening by a vibration isolating member, the vibration isolation member formed of a flexible material.

19. The method of claim 16, wherein engaging the fastener with the lower portion includes applying a tool to a head of the fastener to rotate the fastener and wherein rotating the fastener compresses the fastening assembly along a vertical axis.

* * * * *